(12) United States Patent
Freedman et al.

(10) Patent No.: US 8,761,495 B2
(45) Date of Patent: *Jun. 24, 2014

(54) DISTANCE-VARYING ILLUMINATION AND IMAGING TECHNIQUES FOR DEPTH MAPPING

(71) Applicant: Primesense Ltd, Tel Aviv (IL)

(72) Inventors: Barak Freedman, Binyamina (IL); Alexander Shpunt, Tel Aviv (IL); Yoel Arieli, Jerusalem (IL)

(73) Assignee: Primesense Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/921,224

(22) Filed: Jun. 19, 2013

(65) Prior Publication Data

US 2013/0279753 A1    Oct. 24, 2013

Related U.S. Application Data

(63) Continuation of application No. 12/522,176, filed as application No. PCT/IL2008/000838 on Jun. 19, 2008, now Pat. No. 8,494,252.

(60) Provisional application No. 60/944,807, filed on Jun. 19, 2007.

(51) Int. Cl.
*G06K 9/00* (2006.01)
(52) U.S. Cl.
USPC .......................................................... 382/154
(58) Field of Classification Search
None
See application file for complete search history.

(56) References Cited

U.S. PATENT DOCUMENTS

| | | | |
|---|---|---|---|
| 5,856,871 A * | 1/1999 | Cabib et al. ................... | 356/503 |
| 6,301,059 B1 * | 10/2001 | Huang et al. .................. | 359/668 |
| 6,377,700 B1 | 4/2002 | Mack et al. | |
| 7,013,040 B2 * | 3/2006 | Shiratani ....................... | 382/154 |
| 7,811,825 B2 * | 10/2010 | Fauver et al. .................. | 436/63 |
| 8,494,252 B2 * | 7/2013 | Freedman et al. ............. | 382/154 |
| 2003/0048237 A1 * | 3/2003 | Sato et al. ..................... | 345/32 |
| 2004/0063235 A1 | 4/2004 | Chang | |
| 2004/0130790 A1 * | 7/2004 | Sales ............................. | 359/619 |
| 2004/0264764 A1 | 12/2004 | Kochi et al. | |
| 2005/0134582 A1 | 6/2005 | Claus et al. | |
| 2005/0135555 A1 | 6/2005 | Claus et al. | |
| 2007/0057946 A1 * | 3/2007 | Albeck et al. ................. | 345/427 |
| 2007/0262985 A1 | 11/2007 | Watanabe et al. | |
| 2008/0031513 A1 * | 2/2008 | Hart .............................. | 382/154 |
| 2008/0037829 A1 | 2/2008 | Givon | |

(Continued)

FOREIGN PATENT DOCUMENTS

JP    2000131040 A    5/2000

OTHER PUBLICATIONS

U.S. Appl. No. 12/844,864 Office Action dated Sep. 26, 2013.
U.S. Appl. No. 12/958,427 Office Action dated Nov. 22, 2013.

(Continued)

*Primary Examiner* — Tahmina Ansari
(74) *Attorney, Agent, or Firm* — D. Kligler I.P. Services Ltd.

(57) ABSTRACT

A method for mapping includes projecting a pattern onto an object (28) via an astigmatic optical element (38) having different, respective focal lengths in different meridional planes (54, 56) of the element. An image of the pattern on the object is captured and processed so as to derive a three-dimensional (3D) map of the object responsively to the different focal lengths.

24 Claims, 5 Drawing Sheets

(56) References Cited

U.S. PATENT DOCUMENTS

| | | | |
|---|---|---|---|
| 2008/0106746 A1* | 5/2008 | Shpunt et al. | 356/610 |
| 2008/0285827 A1* | 11/2008 | Meyer et al. | 382/131 |
| 2009/0046152 A1 | 2/2009 | Aman | |
| 2010/0118123 A1* | 5/2010 | Freedman et al. | 348/46 |
| 2010/0290698 A1* | 11/2010 | Freedman et al. | 382/154 |
| 2011/0043403 A1* | 2/2011 | Loffler | 342/25 A |
| 2011/0310125 A1 | 12/2011 | McEldowney et al. | |

OTHER PUBLICATIONS

Japanese Patent Application # 2011-517308 Office Action dated Jun. 19, 2013.
U.S. Appl. No. 13/036,023 Office Action dated Jul. 17, 2013.
U.S. Appl. No. 12/707,678 Office Action dated Jun. 20, 2013.
International Application PCT/IB2013/051189 Search Report dated Jun. 18, 2013.
U.S. Appl. No. 13/036,023 Office Action dated Sep. 3, 2013.

* cited by examiner

DISTANCE-VARYING ILLUMINATION AND IMAGING TECHNIQUES FOR DEPTH MAPPING

CROSS-REFERENCE TO RELATED APPLICATIONS

This application is a continuation of U.S. patent application Ser. No. 12/522,176 (now U.S. Pat. No. 8,494,252), filed Jul. 6, 2009, in the national phase of PCT Patent Application PCT/IL2008/000838, filed Jun. 19, 2008, which claims the benefit of U.S. Provisional Patent Application 60/944,807, filed Jun. 19, 2007, whose disclosure is incorporated herein by reference.

FIELD OF THE INVENTION

The present invention relates generally to methods and systems for mapping of three-dimensional (3D) objects, and specifically to optical 3D mapping.

BACKGROUND OF THE INVENTION

Various methods are known in the art for optical 3D mapping, i.e., generating a 3D profile of the surface of an object by processing an optical image of the object.

Some methods are based on projecting a laser speckle pattern onto the object, and then analyzing an image of the pattern on the object. For example, PCT International Publication WO 2007/043036, whose disclosure is incorporated herein by reference, describes a system and method for object reconstruction in which a coherent light source and a generator of a random speckle pattern projects onto the object a coherent random speckle pattern. An imaging unit detects the light response of the illuminated region and generates image data. Shifts of the pattern in the image of the object relative to a reference image of the pattern are used in real-time reconstruction of a 3D map of the object.

In other methods of optical 3D mapping, different sorts of patterns are projected onto the object to be mapped. For example, PCT International Publication WO 93/03579 describes a three-dimensional vision system in which one or two projectors establish structured light comprising two sets of parallel stripes having different periodicities and angles. As another example, U.S. Pat. No. 6,751,344 describes a method for optically scanning a subject in which the subject is illuminated with a matrix of discrete two-dimensional image objects, such as a grid of dots. Other methods involve projection of a grating pattern, as described, for example, in U.S. Pat. No. 4,802,759. The disclosures of the above-mentioned patents and publications are incorporated herein by reference.

Other methods for 3D mapping and ranging use coded illumination. For example, Sazbon et al. describe a method of this sort for range estimation in "Qualitative Real-Time Range Extraction for Preplanned Scene Partitioning Using Laser Beam Coding," *Pattern Recognition Letters* 26 (2005), pages 1772-1781, which is incorporated herein by reference. A phase-only filter codes the laser beam into M different diffraction patterns, corresponding to M different range segments in the workspace. Thus, each plane in the illuminated scene is irradiated with the pattern corresponding to the range of the plane from the light source. A common camera can be used to capture images of the scene, which may then be processed to determine the ranges of objects in the scene.

As another example, PCT International Publication WO 2007/105215 (published after the priority date of the present patent application), whose disclosure is incorporated herein by reference, describes a method for mapping in which a pattern of multiple spots is projected onto an object. The positions of the spots in the pattern are uncorrelated, but the shapes of the spots share a common characteristic. In some embodiments, the spot shape characteristic changes with distance from the illumination source. This distance-varying shape characteristic may be achieved by passing the illumination beam through one or more optical elements that are designed to superpose two optical constraints: one to split the beam into multiple spots, and another to create the distance-varying shape. An image of the spots on the object is captured and processed so as to derive a 3D map of the object.

SUMMARY OF THE INVENTION

Embodiments of the present invention that are described hereinbelow provide methods and systems for optical 3D mapping of an object. These methods operate by projection of a light pattern onto the object, capturing an image of the pattern on the object, and processing the image to detect features of the pattern that vary with distance.

There is therefore provided, in accordance with an embodiment of the present invention, a method for mapping, including:

projecting a pattern onto an object via an astigmatic optical element having different, respective focal lengths in different meridional planes of the element;

capturing an image of the pattern on the object; and processing the image so as to derive a three-dimensional (3D) map of the object responsively to the different focal lengths.

In some embodiments, the astigmatic optical element causes the pattern that is projected on the object to be elongated with a direction of elongation that varies with a distance from the element, and processing the image includes finding the distance to the object responsively to the direction of the elongation. The pattern may include multiple spots, which are projected onto the object by the astigmatic optical element as ellipses, having respective major axes in the direction of elongation. The ellipses have respective minor axes, and the major and minor axes of each ellipse have respective lengths, and finding the distance may include comparing the respective lengths of the major and minor axes.

In one embodiment, the astigmatic optical element includes a combination of at least two cylindrical lens surfaces in different, respective orientations. Alternatively or additionally, the astigmatic optical element may include a diffractive optical element or an off-axis element.

There is also provided, in accordance with an embodiment of the present invention, a method for mapping, including:

directing light via an aperture so as to project onto an object a diffraction pattern characterized by a transition from near-field to far-field diffraction;

capturing an image of the diffraction pattern on the object; and processing the image so as to derive a three-dimensional (3D) map of the object responsively to the transition of the diffraction pattern.

In a disclosed embodiment, directing the light includes projecting multiple spots onto the object, wherein each spot exhibits the diffraction pattern responsively to a distance from the aperture of a respective location on the object onto which the spot is projected.

There is additionally provided, in accordance with an embodiment of the present invention, a method for mapping, including:

capturing an image of an object, which has a surface with features having respective shapes at respective locations on the surface, using an optical objective that is configured to modify the shapes of the features in the image as a function of a distance of the respective locations from the objective; and processing the image so as to derive a three-dimensional (3D) map of the object responsively to the modified shapes of the features.

In disclosed embodiments, the method includes projecting a pattern of multiple spots onto the surface of the object, wherein the features in the image include the spots, and wherein processing the image includes analyzing the shapes of the spots in the image.

In one embodiment, the optical objective includes an astigmatic optical element having different, respective focal lengths in different meridional planes of the element. Alternatively or additionally, the objective may include a diffractive optical element.

There is further provided, in accordance with an embodiment of the present invention, a method for mapping, including:

projecting a pattern having a size characteristic onto an object from an illumination assembly at a first distance from the object;

capturing an image of the pattern on the object using an image capture assembly at a second distance from the object, which is different from the first distance; and processing the image so as to derive a three-dimensional (3D) map of the object responsively to the size characteristic of the pattern in the image and to a difference between the first and second distances.

Typically, the projected pattern includes multiple spots, and the size characteristic is selected from a set of characteristics consisting of sizes of the spots and distances between the spots.

There is moreover provided, in accordance with an embodiment of the present invention, apparatus for mapping, including:

an illumination assembly, which includes an astigmatic optical element having different, respective focal lengths in different meridional planes of the element and is configured to project a pattern onto an object via the astigmatic optical element;

an image capture assembly, which is configured to capture an image of the pattern on the object; and an image processor, which is configured to process the image so as to derive a three-dimensional (3D) map of the object responsively to the different focal lengths.

There is furthermore provided, in accordance with an embodiment of the present invention, apparatus for mapping, including:

an illumination assembly, which includes an aperture and is configured to direct light via the aperture so as to project onto an object a diffraction pattern characterized by a transition from near-field to far-field diffraction;

an image capture assembly, which is configured to capture an image of the diffraction pattern on the object; and an image processor, which is configured to process the image so as to derive a three-dimensional (3D) map of the object responsively to the transition of the diffraction pattern.

There is also provided, in accordance with an embodiment of the present invention, apparatus for mapping, including:

an image capture assembly, which is configured to capture an image of an object, which has a surface with features having respective shapes at respective locations on the surface, and includes an optical objective that is configured to modify the shapes of the features in the image as a function of a distance of the respective locations from the objective; and an image processor, which is configured to process the image so as to derive a three-dimensional (3D) map of the object responsively to the modified shapes of the features.

There is additionally provided, in accordance with an embodiment of the present invention, apparatus for mapping, including:

an illumination assembly, which is located at a first distance from an object and is configured to project a pattern having a size characteristic onto the object;

an image capture assembly, which is located at a second distance from the object, which is different from the first distance, and is configured to capture an image of the pattern on the object; and an image processor, which is configured to process the image so as to derive a three-dimensional (3D) map of the object responsively to the size characteristic of the patter in the image and to a difference between the first and second distances.

The present invention will be more fully understood from the following detailed description of the embodiments thereof, taken together with the drawings in which:

DETAILED DESCRIPTION OF EMBODIMENTS

System Overview

Figure 1:
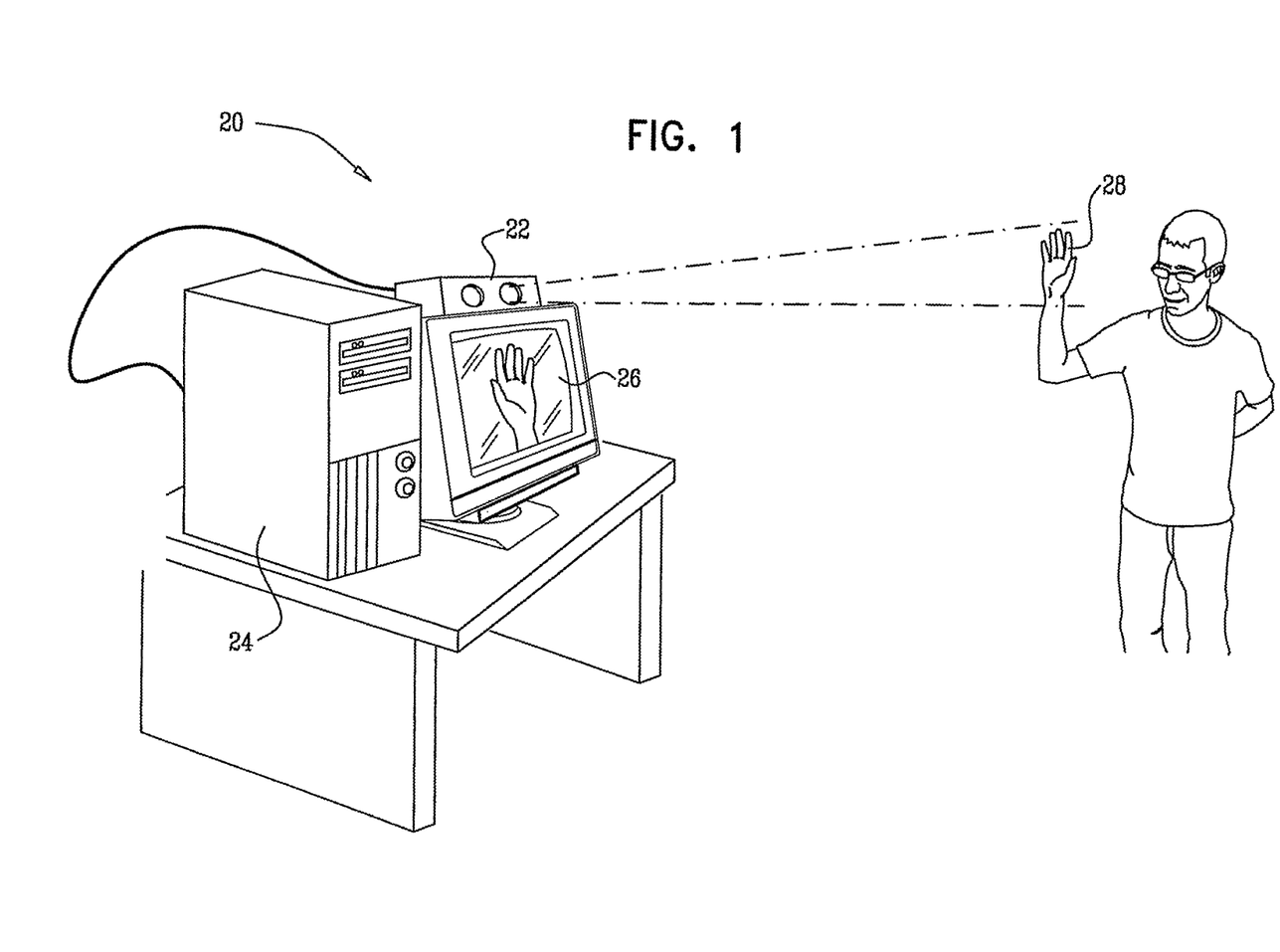
FIG. 1 is a schematic, pictorial illustration of a system for 3D mapping, in accordance with an embodiment of the present invention.

FIG. 1 is a schematic, pictorial illustration of a system 20 for 3D optical mapping, in accordance with an embodiment of the present invention. System 20 comprises an imaging device 22, which generates and projects a pattern onto an object 28 and captures an image of the pattern appearing on the object. Details of the design and operation of device 22 are shown in the figures that follow and are described hereinbelow with reference thereto.

In some embodiments, the pattern that is projected by imaging device 22 comprises a pattern of spots, which may be either bright or dark and may have any suitable shapes, including shapes that exhibit random variations. In some embodiments, the pattern comprises a speckle pattern, meaning a projected pattern of bright spots whose positions are uncorrelated in planes transverse to the projection beam axis. Speckle patterns of this sort may be created by diffusion of a laser beam or by human or computer design, as described, for example, in the above-mentioned PCT International Publications WO 2007/043036 and WO 2007/105215. In other embodiments, the spots may be arranged in a regular, non-random pattern, such as the type of pattern that may be created by passing the illumination beam through a Damman grating or a suitable lenslet array.

An image processor 24 processes image data generated by device 22 in order to determine the distance to one or more points on the surface of object 28 and thus, typically, to reconstruct a 3D map of the object. The term "3D map" refers to a set of 3D coordinates representing the surface of the object. The derivation of such a map based on image data is referred to herein as "3D mapping" or equivalently, "3D reconstruction." Image processor 24 computes the 3D coordinates of points on the surface of object 28 based on variations in the shapes and/or sizes of the spots appearing in the images captured by device 22, as described hereinbelow. The information provided by the shapes and/or sizes may optionally be supplemented by triangulation, based on the transverse shifts of the spots in the image relative to a reference pattern. Methods for this sort of triangulation-based 3D mapping using a projected laser speckle pattern are described in the above-mentioned PCT publications.

Image processor 24 may comprise a general-purpose computer processor, which is programmed in software to carry out the functions described hereinbelow. The software may be downloaded to processor 24 in electronic form, over a network, for example, or it may alternatively be provided on tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although processor 24 is shown in FIG. 1, by way of example, as a separate unit from imaging device 22, some or all of the processing functions of processor 24 may be performed by suitable dedicated circuitry within the housing of the imaging device or otherwise associated with the imaging device.

The 3D map that is generated by processor 24 may be used for a wide range of different purposes. For example, the map may be sent to an output device, such as a display 26, which shows a pseudo-3D image of the object. In the example shown in FIG. 1, object 28 comprises all or a part (such as a hand) of the body of a subject. In this case, system 20 may be used to provide a gesture-based user interface, in which user movements, detected by means of device 22, control an interactive computer application, such as a game, in place of tactile interface elements such as a mouse, joystick or other accessory. Alternatively, system 20 may be used to create 3D maps of objects of other types, for substantially any application in which 3D coordinate profiles are used.

Pattern Projection Using Astigmatic Optics

Figure 2:
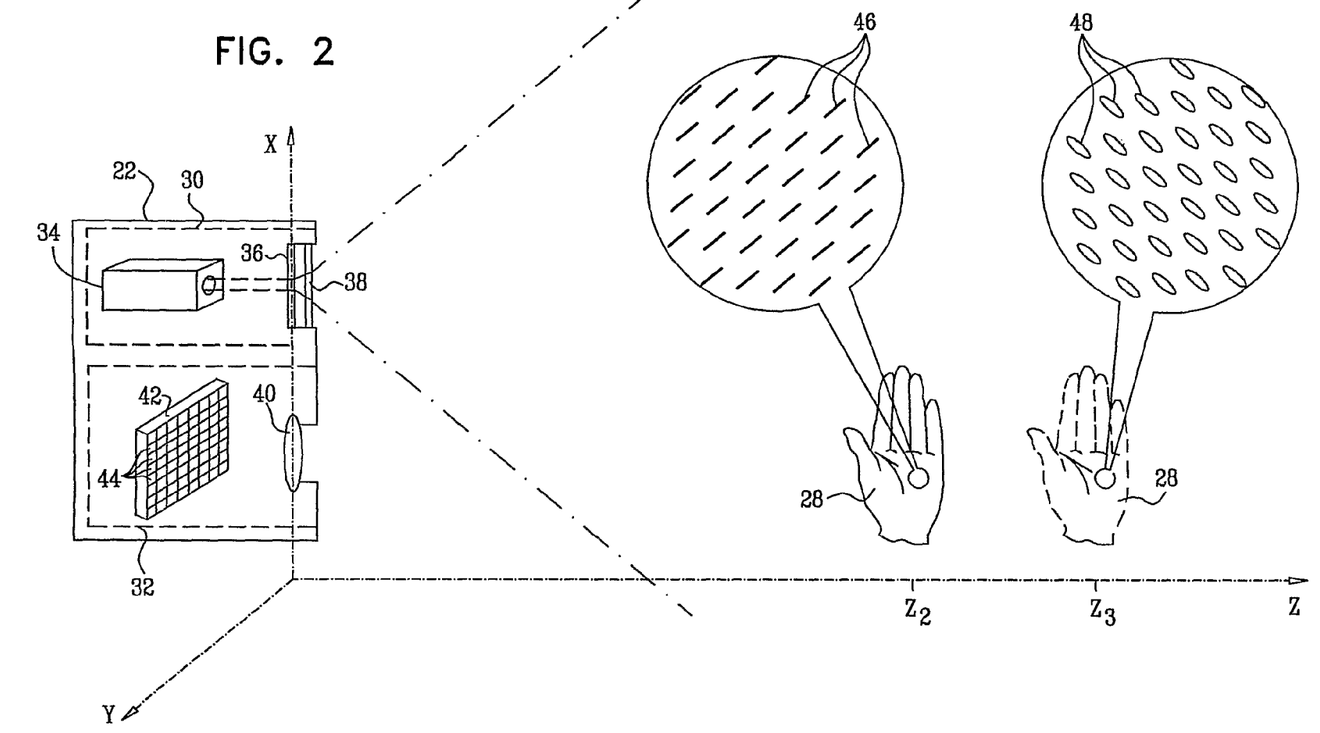
FIG. 2 is a schematic top view of an imaging device for use in 3D mapping, in accordance with an embodiment of the present invention.

FIG. 2 is a schematic top view of device 22, in accordance with an embodiment of the present invention. An illumination assembly 30 in device 22 comprises a light source 34 and a transparency 36, which are used in combination to create a pattern of spots. (The term "light" in the context of the present patent application refers to any sort of optical radiation, including infrared and ultraviolet, as well as visible light.) Light source 34 may comprise a point source, typically a coherent source with large angular divergence, such as a laser diode. Alternatively or additionally, the light source may comprise suitable collimation optics.

The pattern created by light source 34 and transparency 36 is projected by an astigmatic optical element 38 onto object 28. Although transparency 36 is located in FIG. 2 between source 34 and element 38, the relative locations of transparency 36 and element 38 may alternatively be reversed. Optionally, element 38 may also serve as a collimating optic in addition to its astigmatic function. Details of some possible implementations of element 38 are shown schematically in the figures that follow. These figures, however, are meant to illustrate only the general principles of operation of this element. In practical applications, the astigmatism imparted by element 38 will typically be integrated into a more complex optical projection system in order to give the desired pattern quality over the region of interest, as will be apparent to those skilled in the art.

Transparency 36 may be configured to create various sorts of patterns of spots. In some embodiments, the transparency comprises a diffuser, which creates a random speckle pattern when illuminated by a coherent light source. Alternatively, the transparency may contain a pattern of binary (white/black) spots, distributed over the area of the transparency according to the values of a pseudo-random distribution function. Details of these and other means for creating random and pseudo-random patterns are described in the above-mentioned PCT publications. Further alternatively, transparency 36 may contain a regular, non-random pattern of spots or possibly other shapes.

An image capture assembly 32 captures an image of the pattern that has been projected by illumination assembly 30 onto object 28. The image capture assembly comprises objective optics 40 (also referred to simply as an "objective"), which focus the image onto an image sensor 42. Typically, sensor 42 comprises an array of detector elements 44, such as a CCD or CMOS-based image sensor array. Assembly 32 may also comprise a bandpass filter (not shown in the figures), chosen and positioned so that sensor 42 receives only light in the emission band of light source 34, while filtering out ambient light that might otherwise reduce the contrast of the image of the projected pattern that is captured by the sensor.

In the embodiment shown in FIG. 2, illumination assembly 30 and image capture assembly 32 are held in a fixed spatial relation at roughly equal distances from object 28. This configuration and the processing techniques used by image processor 24 make it possible to perform 3D mapping using the single image capture assembly, without relative movement between the illumination and image capture assemblies and without moving parts. Alternatively, the techniques of illumination and mapping that are described hereinbelow may be used in conjunction with other sorts of image capture assemblies, in various different configurations. For example, the illumination and image capture assemblies may be at different distances from the object, as shown below in FIG. 8. Additionally or alternatively, the image capture assembly may be movable relative to the illumination assembly. Further additionally or alternatively, two or more image capture assemblies may be used to capture images of object 28 from different angles.

Astigmatic optical element 38 causes the shapes of the spots that are projected on the object to be elongated with a direction of elongation that varies with distance from element 38. This phenomenon arises because the astigmatic element has different, respective focal lengths in different meridional planes, as shown below in FIG. 4. Thus, in the example shown in FIG. 2, spots 46 on object 28 at a distance $Z_2$ from element 38 are elongated in one direction, while spots 48 at another distance $Z_3$ are elongated along the perpendicular direction. The spots are projected as ellipses, having respective major axes in the direction of elongation (although the minor axis of spots 46 is very small, so that the ellipses appear to be collapsed into lines, which appear on the diagonal in this example). Although all of the spots at each distance in FIG. 2 are shown, for the sake of simplicity, as having the same direction of elongation, in practice the spots on different areas of the surface of the object may have different directions if these areas are at different distances from element 38.

To generate the 3D map of object 28, image processor 24 (FIG. 1) determines the direction of elongation of each spot 46, 48 in the image of the object that is captured by assembly 32. The image processor then finds the distance to each point on the object surface onto which a spot is projected based on the direction of the elongation of that spot. Furthermore, for finer distance resolution, the image processor may compare the length of the major and minor axes of the elliptical spots, since this ratio will change gradually as a function of the distance. This ratio may be determined individually for each spot or collectively over multiple spots to give a local average distance with increased robustness.

The spot direction calculation may be used by itself or in combination with other methods of image analysis for distance determination. For example, image processor 24 may match the group of spots in each area of the captured image to a reference image in order to find the relative shift between the matching groups of spots. The image processor may then use this shift to find the Z-coordinate of the corresponding area of the object by triangulation, as described in the above-mentioned PCT international publications.

Figure 3:
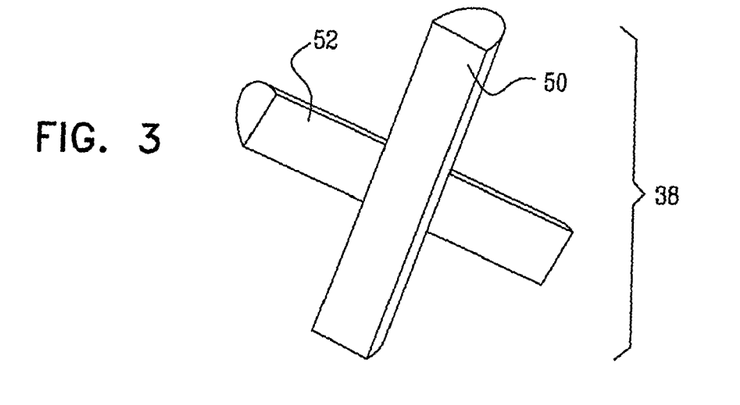
FIG. 3 is a schematic; pictorial illustration of an astigmatic optical element, in accordance with an embodiment of the present invention.
Figure 4:
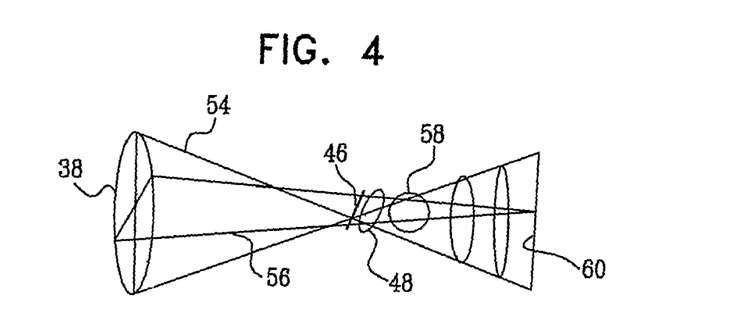
FIG. 4 is a schematic ray diagram showing focal behavior of an astigmatic optical element, in accordance with an embodiment of the present invention.

Reference is now made to FIGS. 3 and 4, which schematically illustrate aspects of astigmatic optical element 38, in accordance with an embodiment of the present invention. FIG. 3 is a pictorial illustration showing one possible mode of construction of the element, while FIG. 4 is ray diagram showing focal behavior of the element.

In the embodiment shown in FIG. 3, element 38 comprises two cylindrical lenses 50 and 52, which have different focal lengths and are oriented at different angles about the optical axis. Typically (although not necessarily), these elements are oriented with their planes of symmetry at right angles to one another. Although lenses 50 and 52 are shown in the figure, for the sake of simplicity, as separate optical components, element 38 may equivalently be fabricated as a single component with multiple optical surfaces. For example, element 38 may have one cylindrical surface with a certain radius and axis of curvature and another cylindrical surface with a perpendicular axis of curvature and a different radius. As another alternative, element 38 may comprise multiple cylindrical segments with different radii and axes of curvature. As noted above, the cylindrical surfaces of element 38 may typically be integrated with other optical components and/or surfaces in order to project the appropriate pattern onto object 28 with the desired quality.

As illustrated in FIG. 4, lens 50 focuses the light from source 34 in one meridional plane 54, while lens 52 focuses the light in another meridional plane 56, which in this case is perpendicular to plane 54. (The term "meridional plane" is used in the present patent application and in the claims in its conventional sense, to mean a plane that contains the optical axis of element 38.) Lens 50 has its focus at a distance $f_1$, at which spot 46 appears as a line in plane 56, while the focus of lens 52 is at a distance $f_2$, where a spot 60 appears as a line in plane 54. In between these foci, spots 48, 58, etc., have elliptical shapes, with varying major and minor axes. The transition of the axes of the ellipses passes through the circular shape of spot 58 at which the major and minor axes are equal.

Assuming lens 50 to have height $h_1$ (the dimension in the direction perpendicular to its meridional plane 54), and lens 52 to have height $h_2$, the respective lengths of spots 46 and 60 will be $l_1$ and $l_2$, as given by:

$$l_1 = \frac{f_2 - f_1}{f_2} h_2$$

$$l_2 = \frac{f_2 - f_1}{f_1} h_1$$

The major and minor axes of the ellipses between the foci will vary linearly between these limits and may thus be used by processor 24 in computing the distance to the spot on the object.

Figure 5:
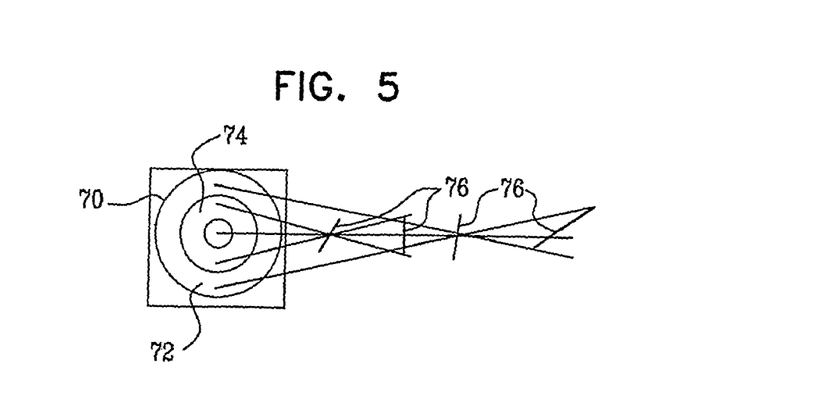
FIG. 5 is a schematic frontal view of a diffractive optical element, in accordance with an embodiment of the present invention.

FIG. 5 is a schematic frontal view of a diffractive optical element (DOE) 70, which may be used in place of element 38 in an alternative embodiment of the present invention. Although the embodiment of FIGS. 3 and 4 uses refractive components to provide the desired astigmatic behavior, a similar result may be achieved using one or more diffractive components. In this example, DOE 70 comprises focal zones 72, 74, ..., which focus the light from a source to linear spots 76 of different orientations at different, respective focal distances. DOE 70 may thus be used in place of element 38 in illumination assembly 30 (FIG. 2), with a similar effect. Methods for creating diffractive optical elements of this sort, as well as other types of diffractive optical elements that may be used in a similar manner, are described in the above-mentioned PCT International Publication WO 2007/105215.

3D Mapping Using Diffraction Patterns

In an alternative embodiment of the present invention, transparency 36 (FIG. 2) comprises a plate containing an aperture or an array of apertures in illumination assembly 30. This embodiment may use an astigmatic optical element in the illumination assembly, but more typically, element 38 is removed and may be replaced by a non-astigmatic projection lens (not shown). By appropriate choice of aperture parameters and optics, the illumination assembly will then project onto object 28 a spot or array of spots that exhibit a diffraction pattern arising from the aperture or array of apertures.

Figure 6A:
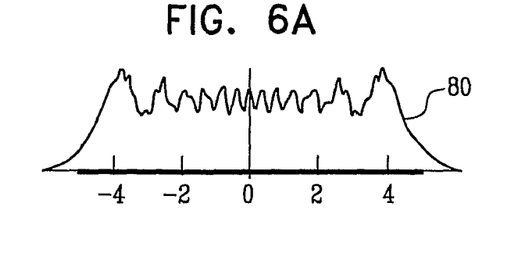
FIGS. 6A and 6B are schematic intensity plots showing near- and far-field diffraction patterns, respectively, which are used in 3D mapping in accordance with an embodiment of the present invention.
Figure 6B:
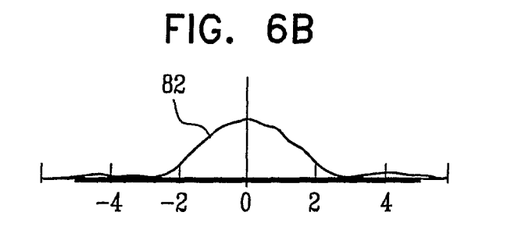

FIGS. 6A and 6B are schematic intensity plots showing near- and far-field diffraction patterns 80 and 82, respectively, that are created in this configuration in accordance with an embodiment of the present invention. Pattern 80 is a typical Fresnel diffraction pattern, which is seen at distances near the aperture, while pattern 82 is a typical Fraunhofer diffraction pattern, seen at larger distances. In between the near- and far-field distances, the spot pattern undergoes a well-defined transition from the near- to far-field form. The characteristics of these diffraction patterns, in terms of width, number of fringes, and depth of the transition from near- to far-field patterns, depend upon the wavelength of the light and the size and shape of the aperture, as is known in the art.

In the present embodiment, image capture assembly 32 captures an image of the diffraction pattern that is projected onto the object. Processor 24 compares the form of the pattern to the expected forms of the near- and far-field patterns (typically including intermediate transition patterns) in order to determine the distance of the object from the illumination assembly. As in the preceding embodiments, when an array of spots is projected onto the object, the processor typically examines the diffraction pattern exhibited by each spot in order to determine the 3D coordinates of the corresponding location on the object and thus create a 3D map of the object. This sort of pattern analysis may similarly be combined with triangulation-based depth information.

Image Capture Using Objective Optics with Non-Uniform Response

In the preceding embodiments, optical elements with non-uniform response, such as astigmatic optics, are used in the illumination assembly to create spots on the object whose shape changes with distance, and this shape change is used in 3D mapping of the object. (In the context of the present patent application and in the claims, terms such as "changes of shape" and "to modify the shape" refer to changes other than the simple linear increase in spot size that normally occurs with distance from the illumination source or objective optics.) In alternative embodiments, on the other hand, objective optics with non-uniform response may be used to create depth-dependent shapes of features in images of the object. The features may comprise spots in a pattern that is projected onto the object or any other suitable type of projected pattern or even inherent features of the object surface itself.

Figure 7:
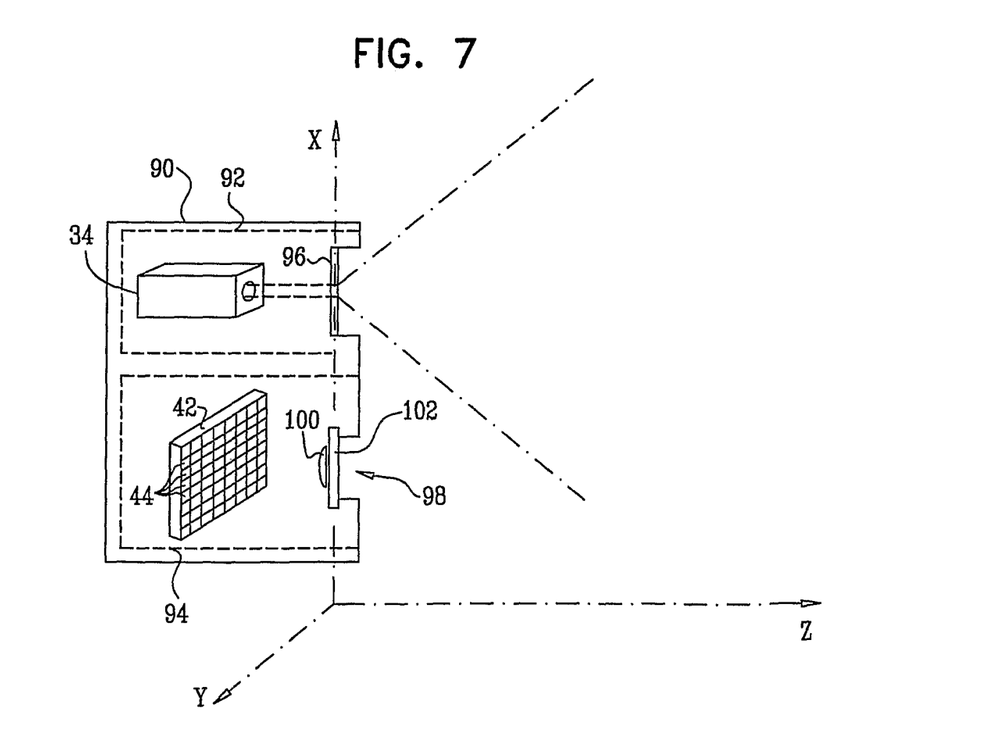
FIG. 7 is a schematic top view of an imaging device for use in 3D mapping, in accordance with another embodiment of the present invention.

FIG. 7 is a schematic top view of an imaging device 90 for use in this sort of 3D mapping, in accordance with an embodiment of the present invention. In this embodiment, an illumination assembly 92 comprises light source 34 and a transparency 96, which casts a pattern of spots onto an object (such as object 28 in the preceding figures). The pattern may be either random or regular. In this embodiment, however, the shapes of the spots need not change significantly with distance from the illumination assembly over the range of distances that is of interest. (Alternatively, as noted above, it may be possible to forego projection of a pattern and use inherent features of the object surface in the technique of 3D mapping that is described below.)

An image capture assembly 94 comprises an astigmatic optical objective 98, which forms an image on sensor 42 of the spot pattern that is projected onto the object. In this simplified example, objective 98 comprises two cylindrical lenses 100 and 102 in different orientations, like the lenses shown in FIG. 3. (More typically, the objective in assembly 94 may incorporate astigmatic properties as part of its overall imaging design.) As a result of this design, when objective 98 creates an image on array 42 of the pattern that has been projected onto the object, the shapes of the spots that appear in the image are modified as a function of the distance of the locations of the corresponding spots on the object from the objective. Specifically, the spots in the image are elongated and may be elliptical in shape, wherein the direction of elongation varies with the distance, in a manner similar to the elliptical spots that are projected onto object 28 in FIGS. 2-4.

Processor 24 analyzes the spot shapes in order to determine the 3D coordinates of the spot locations and thus derive a 3D map of the object. Again, this sort of shape analysis may be combined with triangulation-based shift analysis, as described above.

In other embodiments, objective 98 may comprise a diffractive optical element (DOE), which likewise modifies the shapes of the spots in the image as a function of object distance. The DOE may have an astigmatic response, like the DOE shown above in FIG. 5, for example, or it may have any other suitable sort of distance-dependent shape-altering characteristics. The above-mentioned PCT International Publication WO 2007/105215 describes other sorts of diffractive optical elements that may be used for this purpose, mutatis mutandis.

Alternatively or additionally, objective 98 may comprise other sorts of refractive optical elements with sufficient astigmatism to create a suitable shape variation of the spots in the image. For example, an off-axis spherical lens may be used for this purpose.

3D Mapping Using Distance-Based Variation of Size Characteristics

In the embodiments shown in the preceding figures, it is convenient that the illumination and image capture assemblies be located at approximately the same distance from object 28. As a result, the size characteristics of the projected pattern (such as the sizes of the spots and distances between the spots) in the image of the pattern that is formed on the image sensor do not change significantly with distance of the spot locations on the object from the imaging assembly. The reason for the constant size characteristics in the image stems simply from geometrical optics: The projected pattern on the object is magnified linearly with the distance, and the respective images of this pattern are demagnified linearly in the same proportion. In other words, the angular extent of any given spot or distance between spots in both the projected pattern and in the image remains constant regardless of the distance to which the spots are projected.

Figure 8:
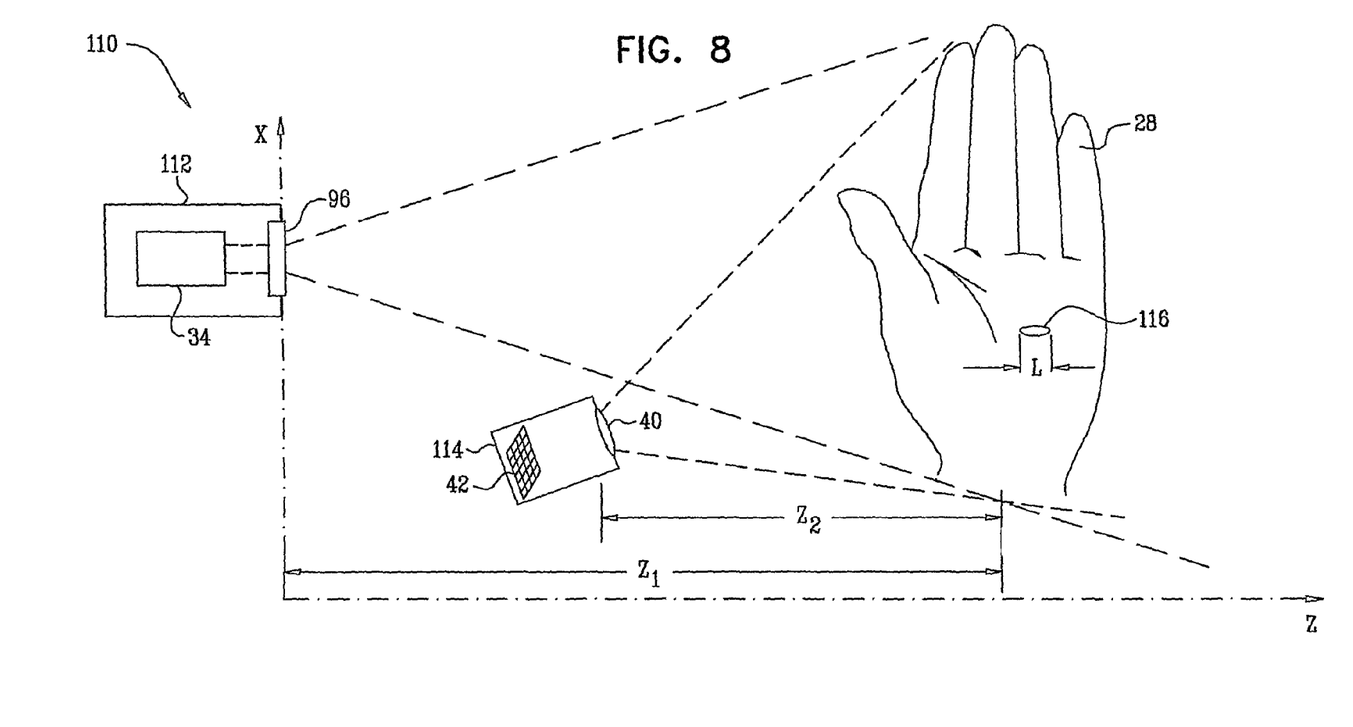
FIG. 8 is a schematic top view of a system for 3D mapping, in accordance with an alternative embodiment of the present invention.

FIG. 8 is a schematic top view of a system 110 for 3D mapping, in accordance with an alternative embodiment of the present invention in which the sizes of the spots in the image vary with distance. In this embodiment, an illumination assembly 112 projects a pattern of spots 116, of characteristic size L, onto object 28 from a given distance $Z_1$. An image capture assembly 114 captures images of the pattern from a different distance $Z_2$, which is significantly different from $Z_1$. Typically, for good results in this sort of embodiment, $Z_2$ is less than $Z_1$ by at least 30%, and may be less than 50% of $Z_1$. Alternatively, $Z_2$ may be significantly greater than $Z_1$. Although the respective illumination and imaging axes of assemblies 112 and 114 are shown in FIG. 8 as being angled relative to one another, these axes may alternatively be made parallel or even collinear, by use of a suitable beamsplitter, for example.

In order to create a 3D map of object 28, processor 24 (FIG. 1) may store a reference image captured by assembly 114 of the pattern projected by assembly 112 onto a reference plane at a known distance. Spots 116 in this pattern will have a particular size and spacing in the image, determined by the relative magnifications of the illumination and image capture assemblies. When the pattern is projected onto the actual object, a spot at a location that is displaced by a depth Δ relative to the reference plane will increase in size (assuming Δ>0) by roughly $Z_1+Δ/Z_1$, while the demagnification by objective 40 will increase by roughly $Z_2+Δ/Z_2$, and the distances between spots will vary in like manner. Therefore, assuming $Z_1>Z_2$, the image and spacing of the spots on sensor 42 will undergo a net decrease with increasing Δ (or a net increase in the image spot size and spacing for Δ<0). Assuming distances $Z_1$ and $Z_2$ are approximately known in advance, the processor may compute the local distance variations and thus derive a 3D map of the object based on the spot sizes and/or distances between spots in the image.

Although FIG. 8 shows a roughly circular spot, the principles of this embodiment may likewise be applied to patterns of other types and shapes. Furthermore, this method of distance determination based on spot size and/or spacing may be combined with the other techniques that are described above, based on other aspects of the shapes and/or locations of the spots (or other features) in the image of the projected pattern on the object.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for mapping, comprising:
projecting a pattern onto an object via an astigmatic optical element having different, respective focal lengths in different meridional planes of the element;
capturing an image of the pattern on the object; and
processing the image so as to derive a three-dimensional (3D) map of the object based on features of the image that vary responsively to the different focal lengths.

2. The method according to claim 1, wherein the astigmatic optical element comprises a combination of at least two cylindrical lens surfaces in different, respective orientations.

3. The method according to claim 1, wherein the astigmatic optical element comprises a diffractive optical element.

4. The method according to claim 1, wherein the astigmatic optical element comprises an off-axis element.

5. A method for mapping, comprising:
directing light via an aperture so as to project onto an object a diffraction pattern characterized by a transition from near-field to far-field diffraction;
capturing an image of the diffraction pattern on the object; and
processing the image so as to derive a three-dimensional (3D) map of the object responsively to the transition of the diffraction pattern.

6. The method according to claim 5, wherein directing the light comprises projecting multiple spots onto the object, wherein each spot exhibits the diffraction pattern responsively to a distance from the aperture of a respective location on the object onto which the spot is projected.

7. A method for mapping, comprising:
capturing an image of an object, which has a surface with features having respective shapes at respective locations on the surface, using an optical objective that is configured to modify the shapes of the features in the image as a function of a distance of the respective locations from the objective; and
processing the image so as to derive a three-dimensional (3D) map of the object responsively to the modified shapes of the features.

8. The method according to claim 7, and comprising projecting a pattern of multiple spots onto the surface of the object, wherein the features in the image comprise the spots, and wherein processing the image comprises analyzing the shapes of the spots in the image.

9. The method according to claim 7, wherein the optical objective comprises an astigmatic optical element having different, respective focal lengths in different meridional planes of the element.

10. The method according to claim 7, wherein the objective comprises a diffractive optical element.

11. A method for mapping, comprising:
projecting a pattern having a size characteristic onto an object from an illumination assembly at a first distance from the object;
capturing an image of the pattern on the object using an image capture assembly at a second distance from the object, which is different from the first distance; and
processing the image so as to derive a three-dimensional (3D) map of the object responsively to the size characteristic of the pattern in the image and to a difference between the first and second distances.

12. The method according to claim 11, wherein the projected pattern comprises multiple spots, and wherein the size characteristic is selected from a set of characteristics consisting of sizes of the spots and distances between the spots.

13. An apparatus for mapping, comprising:
an illumination assembly, which comprises an astigmatic optical element having different, respective focal lengths in different meridional planes of the element and is configured to project a pattern onto an object via the astigmatic optical element;
an image capture assembly, which is configured to capture an image of the pattern on the object; and
an image processor, which is configured to process the image so as to derive a three-dimensional (3D) map of the object based on features of the image that vary responsively to the different focal lengths.

14. The apparatus according to claim 13, wherein the astigmatic optical element comprises a combination of at least two cylindrical lenses in different, respective orientations.

15. The apparatus according to claim 13, wherein the astigmatic optical element comprises a diffractive optical element.

16. The apparatus according to claim 13, wherein the astigmatic optical element comprises an off-axis element.

17. An apparatus for mapping, comprising:
an illumination assembly, which comprises an aperture and is configured to direct light via the aperture so as to project onto an object a diffraction pattern characterized by a transition from near-field to far-field diffraction;
an image capture assembly, which is configured to capture an image of the diffraction pattern on the object; and
an image processor, which is configured to process the image so as to derive a three-dimensional (3D) map of the object responsively to the transition of the diffraction pattern.

18. The apparatus according to claim 17, wherein the illumination assembly is configured to project multiple spots onto the object, wherein each spot exhibits the diffraction pattern responsively to a distance from the aperture of a respective location on the object onto which the spot is projected.

19. An apparatus for mapping, comprising:
an image capture assembly, which is configured to capture an image of an object, which has a surface with features having respective shapes at respective locations on the surface, and comprises an optical objective that is configured to modify the shapes of the features in the image as a function of a distance of the respective locations from the objective; and
an image processor, which is configured to process the image so as to derive a three-dimensional (3D) map of the object responsively to the modified shapes of the features.

20. The apparatus according to claim 19, and comprising an illumination assembly, which is configured to project a pattern of multiple spots onto the surface of the object, wherein the features in the image comprise the spots, and wherein the image processor is configured to derive the 3D map responsively to the shapes of the spots in the image.

21. The apparatus according to claim 19, wherein the optical objective comprises an astigmatic optical element having different, respective focal lengths in different meridional planes of the element.

22. The apparatus according to claim 19, wherein the optical objective comprises a diffractive optical element.

23. An apparatus for mapping, comprising:
- an illumination assembly, which is located at a first distance from an object and is configured to project a pattern having a size characteristic onto the object;
- an image capture assembly, which is located at a second distance from the object, which is different from the first distance, and is configured to capture an image of the pattern on the object; and
- an image processor, which is configured to process the image so as to derive a three-dimensional (3D) map of the object responsively to the size characteristic of the patter in the image and to a difference between the first and second distances.

24. The apparatus according to claim 23, wherein the projected pattern comprises multiple spots, and wherein the size characteristic is selected from a set of characteristics consisting of sizes of the spots and distances between the spots.

* * * * *